United States Patent
Wang et al.

(10) Patent No.: US 7,388,991 B2
(45) Date of Patent: Jun. 17, 2008

(54) DATA ENCODING METHODS AND CIRCUITS

(75) Inventors: Yu-Min Wang, Taichung (TW); Heng-Kuan Lee, Sindian (TW)

(73) Assignee: Faraday Technology Corp., Hsin-Chu (TW)

( * ) Notice: Subject to any disclaimer, the term of this patent is extended or adjusted under 35 U.S.C. 154(b) by 820 days.

(21) Appl. No.: 10/983,805

(22) Filed: Nov. 8, 2004

(65) Prior Publication Data

US 2005/0238246 A1  Oct. 27, 2005

(30) Foreign Application Priority Data

Apr. 21, 2004  (TW) .............................. 93111085 A

(51) Int. Cl.
*G06K 9/36*    (2006.01)
*G06K 9/46*    (2006.01)

(52) U.S. Cl. ...................................... 382/232; 382/248

(58) Field of Classification Search ................ 382/232, 382/248, 250
See application file for complete search history.

(56) References Cited

U.S. PATENT DOCUMENTS 5,142,380 A * 8/1992 Sakagami et al. .......... 382/250
5,959,872 A * 9/1999 Son ............................ 708/402

* cited by examiner

*Primary Examiner*—Phuoc Tran
(74) *Attorney, Agent, or Firm*—Winston Hsu

(57) ABSTRACT

A data encoding method. First, a data array comprising a plurality of elements is stored in a memory. The number of elements unequal to a predetermined value is counted while elements of the array are stored in the memory. Then, a control module reads elements from the data array, and determines whether the number of read elements unequal to the predetermined value is equal to the counted number. When the number of read elements unequal to the predetermined value is equal to the counted number, the control module stops reading elements from the data array.

16 Claims, 11 Drawing Sheets

| Q00 | Q01 | Q02 | Q03 | Q04 | Q05 | Q06 | Q07 |
|-----|-----|-----|-----|-----|-----|-----|-----|
| Q10 | Q11 | Q12 | Q13 | Q14 | Q15 | Q16 | Q17 |
| Q20 | Q21 | Q22 | Q23 | Q24 | Q25 | Q26 | Q27 |
| Q30 | Q31 | Q32 | Q33 | Q34 | Q35 | Q36 | Q37 |
| Q40 | Q41 | Q42 | Q43 | Q44 | Q45 | Q46 | Q47 |
| Q50 | Q51 | Q52 | Q53 | Q54 | Q55 | Q56 | Q57 |
| Q60 | Q61 | Q62 | Q63 | Q64 | Q65 | Q66 | Q67 |
| Q70 | Q71 | Q72 | Q73 | Q74 | Q75 | Q76 | Q77 |

FIG. 5a

| 68 | -13 | -3 | 1 | 0 | 1 | 0 | 0 |
|----|-----|----|----|----|----|----|----|
| 8  | 11  | -1 | 0 | 0 | 0 | 0 | 0 |
| -5 | 2   | 0  | 0 | 0 | 0 | 0 | 0 |
| -3 | 1   | 0  | 0 | 0 | 0 | 0 | 0 |
| 2  | 0   | 0  | 0 | 0 | 0 | 0 | 0 |
| -1 | 0   | 0  | 0 | 0 | 0 | 0 | 0 |
| 0  | 0   | 0  | 0 | 0 | 0 | 0 | 0 |
| 0  | 0   | 0  | 0 | 0 | 0 | 0 | 0 |

| 0 | 4 | 6 | 20 | 22 | 36 | 38 | 52 |
| --- | --- | --- | --- | --- | --- | --- | --- |
| 1 | 5 | 7 | 21 | 23 | 37 | 39 | 53 |
| 2 | 8 | 19 | 24 | 34 | 40 | 50 | 54 |
| 3 | 9 | 18 | 25 | 35 | 41 | 51 | 55 |
| 10 | 17 | 26 | 30 | 42 | 46 | 56 | 60 |
| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

| 0 | 1 | 2 | 3 | 10 | 11 | 12 | 13 |
|---|---|---|---|----|----|----|----|
| 4 | 5 | 8 | 9 | 17 | 16 | 15 | 14 |
| 6 | 7 | 19 | 18 | 26 | 27 | 28 | 29 |
| 20 | 21 | 24 | 25 | 30 | 31 | 32 | 33 |
| 22 | 23 | 34 | 35 | 42 | 43 | 44 | 45 |
| 36 | 37 | 40 | 41 | 46 | 47 | 48 | 49 |
| 38 | 39 | 50 | 51 | 56 | 57 | 58 | 59 |
| 52 | 53 | 54 | 55 | 60 | 61 | 62 | 63 |

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG. 9

DATA ENCODING METHODS AND CIRCUITS

BACKGROUND

The invention relates to a method and devices for reducing multimedia data compression/encoding time, and in particular, to methods and devices for avoiding access to zero values in a frequency domain region.

With the improvement of signal detection and processing techniques, still images, video, and audio data can be preserved, processed, transmitted in electronic formats (especially in digital formats) in high fidelity. Generally, multimedia files are quite large, thus requiring compression before storage and transmission. Accordingly, compressed multimedia data must be decompressed before display. Compression of multidimensional image data (such as 2-dimensional images and/or time-domain changes) is particularly resource consumptive. Hence, compressing image data with high efficiency and low cost has become a significant issue.

FIG. 1 is a flowchart of conventional image compression (data compression), such as Motion Picture Expert Group (MPEG) compression. As shown in FIG. 1, a motion image data M (such as a movie or an animation) may be treated as a series of static pictures A1, A2, A3, A5, and others, displayed sequentially to simulate motion. To achieve a high compression ratio, compression of the video data comprises detecting differences between the static pictures (intra-coding) in step 10, and encoding frames (inter-coding) in step 12.

There may be little difference between frames of a video clip simulating continuous motion. For example, sequential display of the pictures A1, A2, and A3 in FIG. 1 simulates motion of an object Oj moving against background Bk, wherein there is no perceptible difference in the pictures A1, A2, and A3 except the object Oj. In step 10, a motion detection operation may be performed to detect differences between frames. For example, that object Oj in FIG. 1 moves and background Bk is still may be recognized by detecting the pictures A1 and A2. Additionally, vector V12 is derived to represent the movement direction and distance of traveled by the object Oj. Put simply, the object Oj in the picture A1 is moved along with the vector V12 (known as motion compensation) to yield a predicted image P2 (not shown in FIG. 1) to simulate the picture A2. Predicted the picture P2 is, however, only a prediction of the picture A2, and may not precisely match the picture A2. For example, reflected areas of light on the object Oj may differ between the pictures A1 and A2. The difference between the predicted image P2 and the picture A2 is assumed to be imperceptible, and the picture A2 is subtracted by the predicted image P2 to yield difference image D12. Thus, the frame comprising the picture A2 may be generated by motion compensating the picture A1 and adding the difference image D12 to the compensated picture A1. Thus, the picture A1, vector V12, and image D12 can represent the pictures A1 and A2. Image D12 may comprise little data as long as the difference between the predicted image P2 and the picture A2 is small, facilitating a high compression ratio of the pictures A1 and A2.

Similarly, the picture A3 in FIG. 1 may be presented utilizing the picture A2, vector V23, and image D23. The picture A1, images D12, D23, vector V12, and V23 simulate a portion of video M comprising the pictures A1, A2, and A3, whereby compressing the portion of video M accordingly. The video M may comprise completely irrelevant portions. For example, the pictures A4 and A5 simulate motion of other objects moving in another background, so the picture A3 may be quite different from the picture A4. Motion detection is applied to the pictures A4 and A5 instead of A3 and A4 to compress the portion of video M comprising the pictures A4 and A5 in step 10.

After intra-encoding in step 10, pictures, such as the pictures A1 and A4 in FIG. 1, and difference images, such as the image D12, D23, and D45 are respectively encoded/compressed in step 12 to enhance compression ratio. The detailed procedures of step 12 are shown in FIG. 2. When compressed, a pictures A, such as the pictures A1, A4, the images D12, or D23, is first fragmented into blocks B each comprising pixels Bij. 2-dimensional frequency domain transformation, such as Discrete Cosine Transform (DCT), is applied to each block B to generate array C comprising elements Cij representing frequency values of block B. Elements Qij generated from quantization of the elements Cij comprise quantized array Q which is a frequency domain array. The elements Qij of the 2-dimensional array Q are rearranged to an one-dimensional array S in a specific order, this procedure is known as a sequential scan. Run-length encoding is applied to the array S to generate another array R. Huffman encoding is applied to array R to generate array H, and compression of the picture A is complete.

In step 12, because a block B comprises a small portion of the picture A, pixels Bij therein may have approximately the same value. After a block B has been transformed to frequency domain and quantized, most high frequency elements Cij and Qij have a zero value (or have an approximately zero value). In other words, arrays C and Q are sparse arrays. Elements Sk of the array S, each representing a Qij, may also comprise a plurality of zero values. Zero values between non-zero elements Sk are encoded to shorten the length thereof during the run-length encoding of array S to shorten the length thereof. For example, in a case wherein 10 zero values exist between non-zero elements Si and Sj, element Sj may be encoded to represent and replace the actual 10 zero values. Thus, the length of the array R generated by run-length encoding the array S is shortened. The length of the array H is further shortened after Huffman encoding of the array R. A plurality of the arrays R generated from compressing all blocks B comprise compressed multimedia data, the result of compressing the picture A.

When compressing a still image (such as JPEG compression), step 12 may be performed directly to omit step 10.

FIG. 3 is a block diagram of conventional image compression/decompression circuits. The processing circuit 300 compresses/encodes image data and comprises a central processing unit (CPU) 302, a memory access module 304, a dynamic estimation module 306, a frequency domain transformation/quantization module 308, a scan control module 310, and an internal memory 312 (such as random access memories). The CPU 302 controls all operations of the processing circuit 300. The Memory access module 304 is capable of direct memory access (DMA) and enables the processing circuit 300 to access an external storage 350 directly, for example, to import a compression source therefrom. The dynamic estimation module 306 may perform dynamic estimation in step 10. The frequency domain transformation/quantization module 308 may perform frequency domain transformation and quantization in step 12. The internal memory 312 temporarily stores data processed by the processing circuit 300.

For example, when the processing circuit 300 compressing (encoding) image data, the frequency domain transformation/quantization module 308 transforms and quantizes blocks B of each frame to generate the 2-dimensional array Q, and elements Qij therein are written into the internal memory 312 and then read by the scan control module 310 when a sequential scan is performed to generate the array S. The subsequent steps are then performed accordingly.

Thus, the processing circuit 300 frequently accesses the internal memory 312. One video clip may comprise a plurality of pictures A which correspond to a plurality of arrays Q representing blocks B thereof. Elements Qij are stored to the internal memory 312 when the processing circuit 300 compresses image data and are read therefrom during a sequential scan. As previously described, an array Q may be a sparse array most elements Qij of which are zero values, so that the length of the array S may be reduced by run-length encoding. The array R records the number of instances of zero pixel values rather than the actual pixels with a zero value, without taking advantage of the properties of the sparse array. It is time consuming, however, to process and access the elements Qij one by one when the processing circuit 300 performs sequential scanning. Thus image compression is time consuming, and the cost is still high if processing circuit 300 is provided with higher bandwidth internal memory to increase the rate of compression.

SUMMARY

Accordingly, some embodiments of the invention provide a data encoding method. First, a data array comprising a plurality of elements is stored in a memory. The number of elements unequal to a predetermined value is counted while elements of the array are stored in the memory. Then, a control module reads elements from the data array, and determines whether the number of read elements unequal to the predetermined value is equal to the counted number. When the number of read elements unequal to the predetermined value is equal to the counted number, the control module stops reading elements from the data array.

Also disclosed is a data encoding circuit comprising a memory, a calculation module, a control module, and a decision module. The memory stores a data array comprising a plurality of elements. The calculation module counts the number of elements unequal to a predetermined value while elements of the data array are being stored into the memory. The control module reads elements of the data array in a specific order. The decision module determines whether the number of read elements unequal to the predetermined value is equal to the counted number, and when the number of read elements unequal to the predetermined value is equal to the counted number, the decision module notifies the control module to stop reading elements from the data array.

DESCRIPTION OF THE DRAWINGS

Embodiments of the invention can be more fully understood by reading the subsequent detailed description and examples with references made to the accompanying drawings, wherein:

FIG. 5a is a schematic diagram of the configuration of a quantized frequency domain array;

FIG. 5b is a schematic diagram of an example of a quantized frequency domain array;
FIGS. 7 to 9 are schematic diagrams of sequential scan in different orders performed by the processor circuit in FIG. 4.

DETAILED DESCRIPTION

Figure 4:
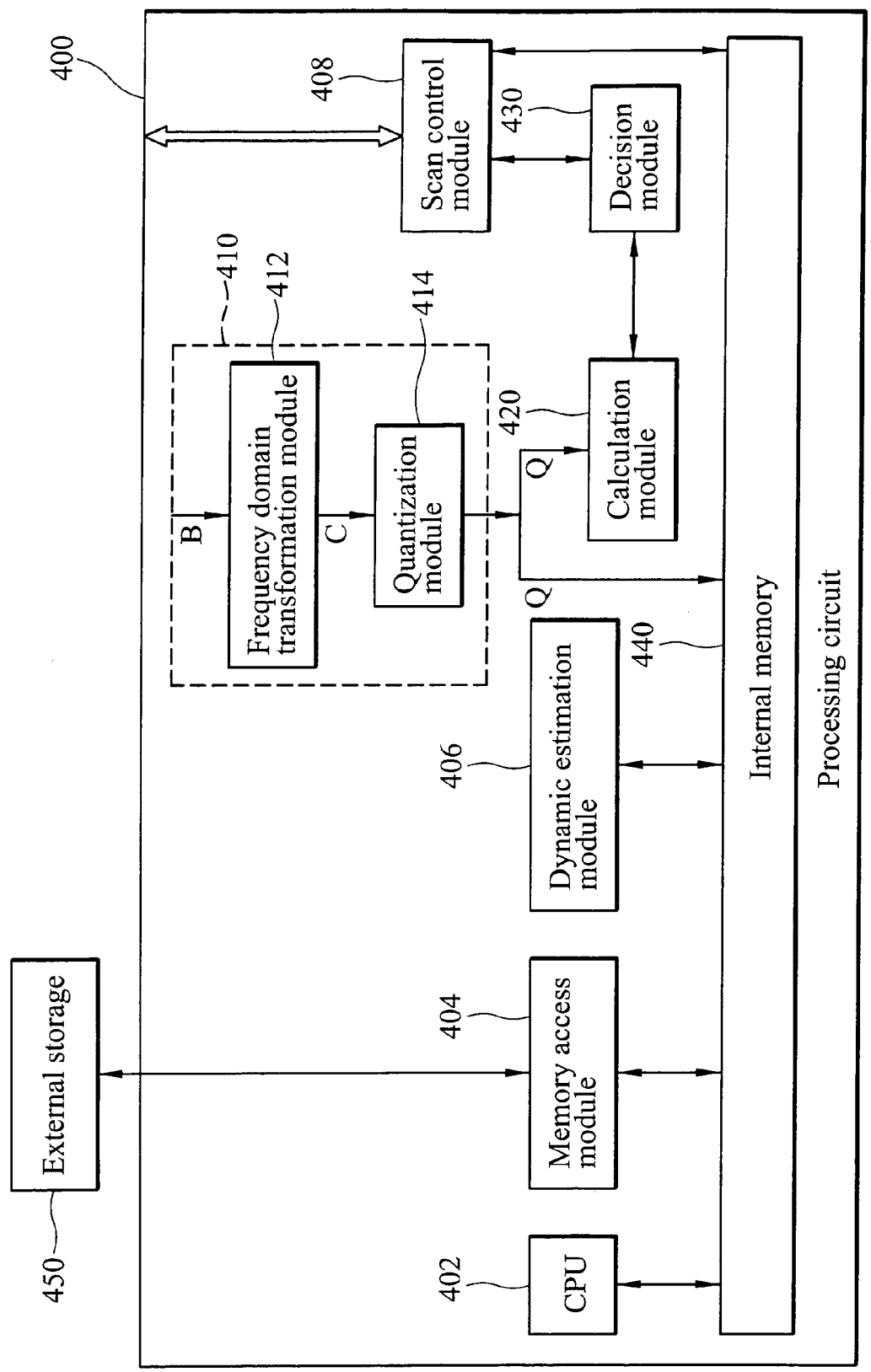
FIG. 4 is a block diagram of a processing circuit according to an embodiment of the invention.

FIG. 4 is a block diagram of circuits according to an embodiment of the invention. A processing circuit 400 compresses/encodes image data and comprises a central processing unit (CPU) 402, a memory access module 404, a dynamic estimation module 406, a frequency domain transformation/quantization module 410, a scan control module 408, and an internal memory 440 (such as random access memories), a calculation module 420, and a decision module 430.

The CPU 402 controls all operations of the processing circuit 400. The memory access module 404 is capable of direct memory access (DMA) and enables the processing circuit 400 to access the external storage 450 directly, for example, to import a compression source therefrom. The dynamic estimation module 406 performs dynamic estimation.

The internal memory 440 temporarily stores data processed by the processing circuit 400.

Figure 1:
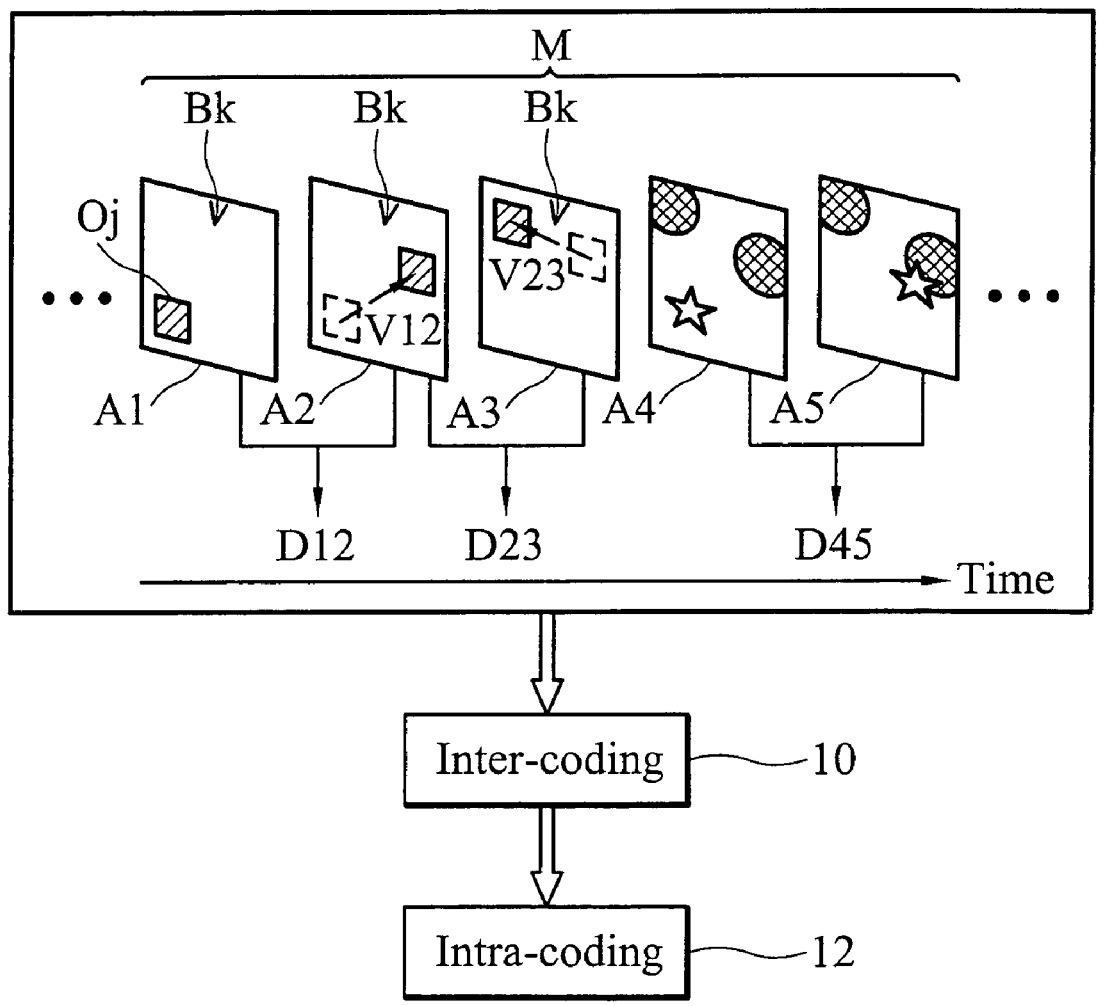
FIG. 1 is a flowchart of conventional image compression.
Figure 2:
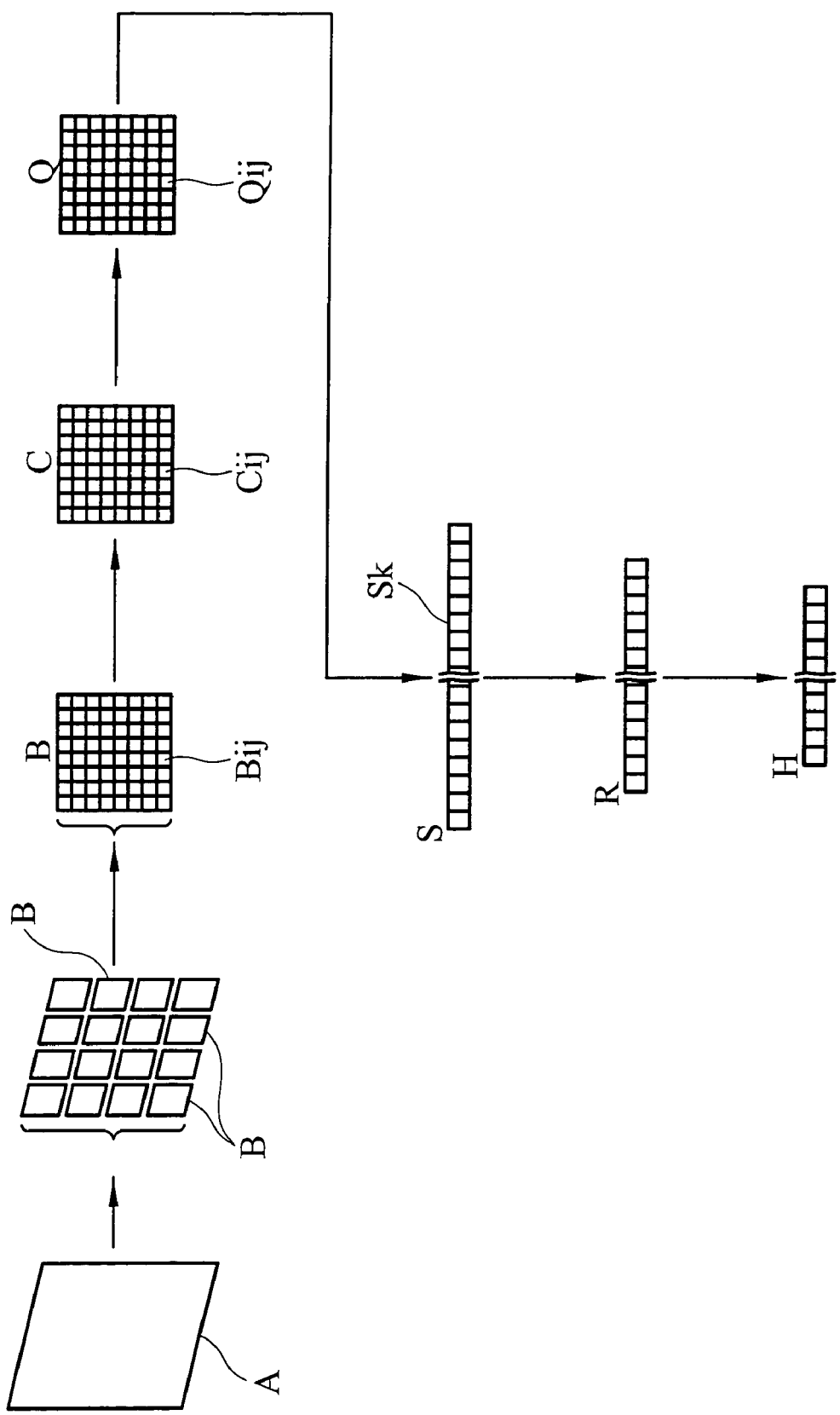
FIG. 2 is a schematic diagram of intra-encoding in FIG. 1.
Figure 3:
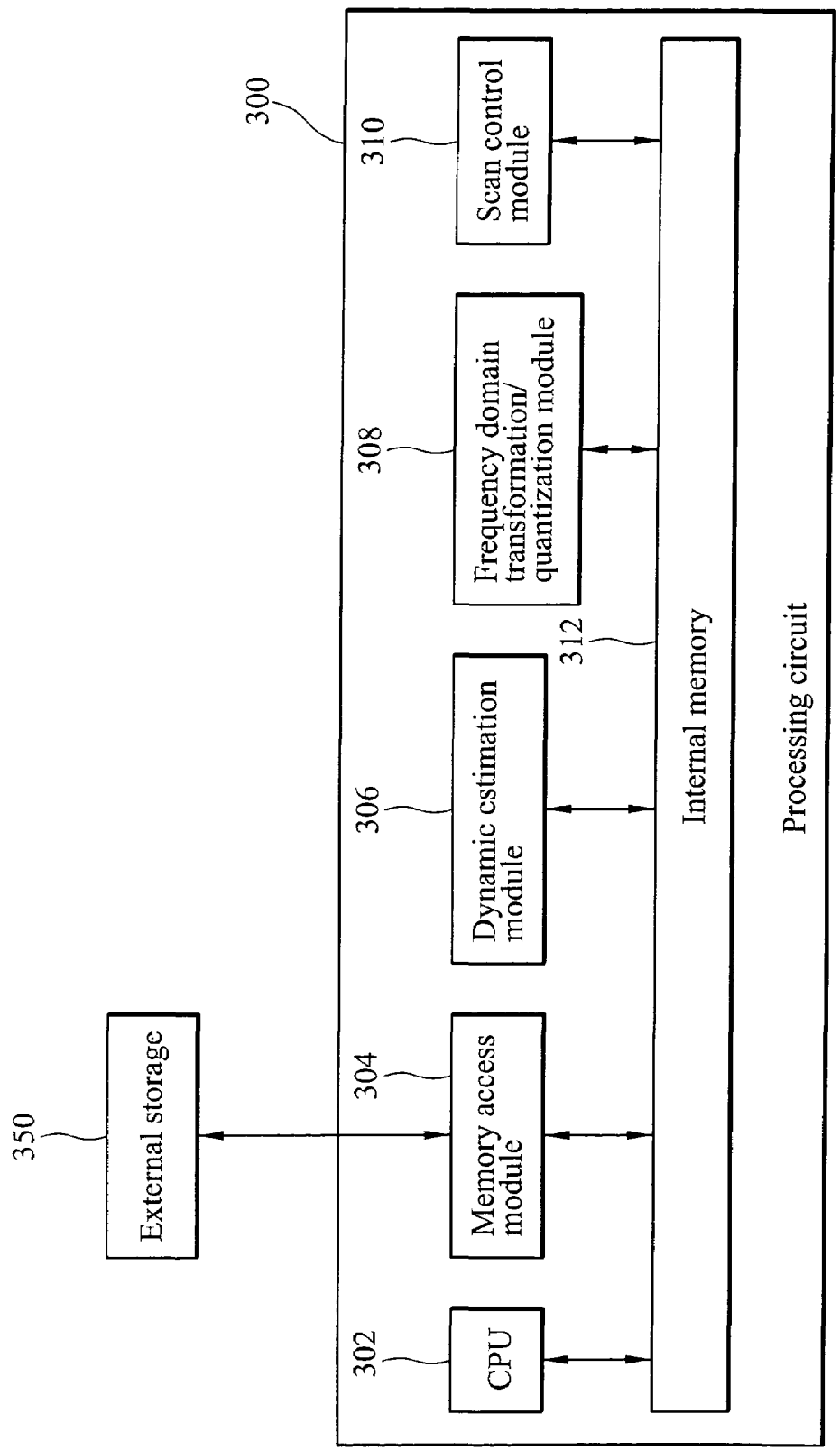
FIG. 3 is a block diagram of conventional image compression/decompression circuits.

The frequency domain transformation/quantization module 410 comprises a frequency domain transformation module 412 and a quantization module 414. The frequency domain transformation module 412 performs frequency domain transformation, such as DCT, to generate array C (in FIG. 2) from blocks B. Generally, the frequency domain transformation/quantization module 410 performs frequency domain transformation and quantization on blocks B to generate the frequency domain arrays Q. Every element Qij of the arrays Q is written (stored) to the internal memory 440, and at the same time, the calculation module 420 counts the number of non-zero elements Qij of an array Q, so no additional time is required to count the number of non-zero elements Qij.

When performing a sequential scan, the scan control module 408 reads elements of the array Q from the internal memory 440 in a specific order, generates a data array S for subsequent encoding steps. In some embodiments of the invention, while the scan control module 408 is reading elements Qij of the array Q from the internal memory 440, the decision module 430 determines whether the number of read non-zero elements Qij is equal to the number counted by the calculation module 420. If so, the decision module 430 notifies the scan control module 408 to stop reading the array Q and outputting elements from the internal memory 440. If not, the decision module 430 notifies the scan control module 408 to keep reading elements from the internal memory 440.

FIG. 5a is a schematic diagram of the configuration of the quantized array Q. A block B comprises 8×8 pixels according to a present image compression specification, such as MPEG. Under this condition, array Q also comprises 8×8 elements, Q00~Q07, Q10~Q17, and Q70~Q77, as shown in FIG. 5a. Bit plane N also comprises 8×8 elements.

As previously described, most arrays Q are sparse matrices wherein most elements are zero values. For example, elements in an array Q processed by the frequency domain transformation/quantization module 410 have a zero value except 14 elements, Q00, Q01, Q02, Q03, Q05, Q10, Q11, Q12, Q20, Q21, Q30, Q31, Q40, Q50.

Image compression according to some embodiments of the invention comprises the following procedures. First, while array Q generated by the frequency domain transformation/quantization module 410 is stored in internal memory 440, calculation module 420 counts the number of non-zero elements Qij in the array Q.

Figure 6:
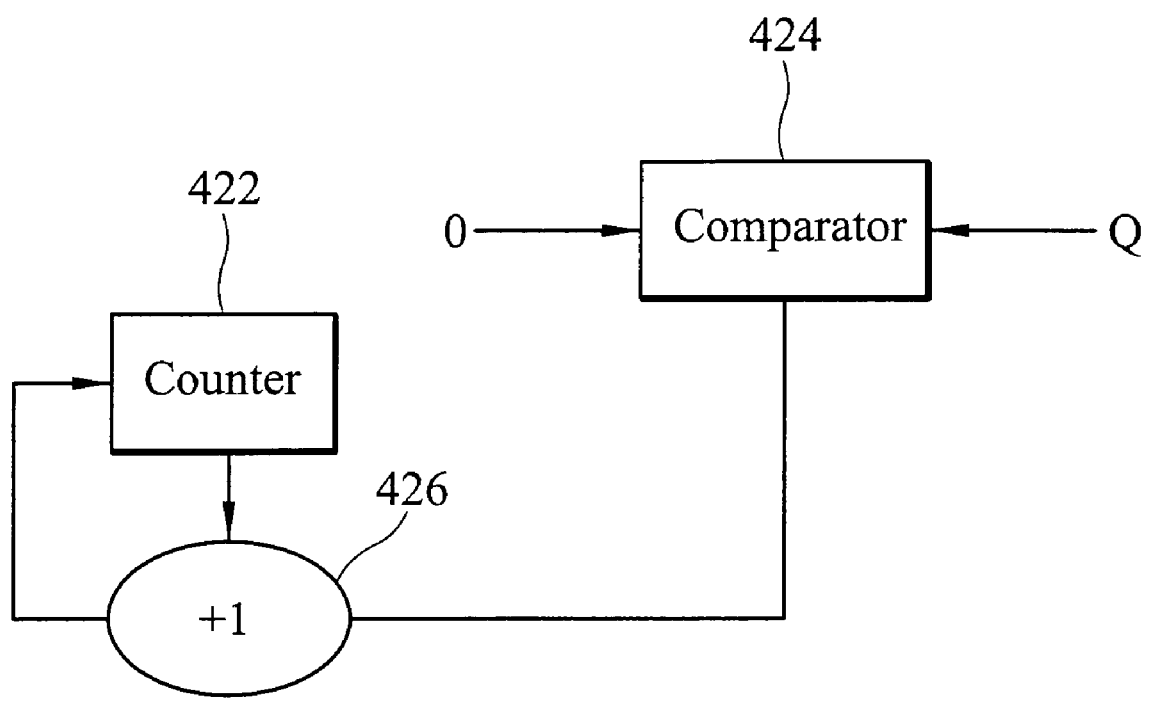
FIG. 6 is a block diagram of an exemplary calculation module in FIG. 4 according to an embodiment of the invention.

FIG. 6 is a block diagram of an example of the calculation module 420. As shown in FIG. 6, the calculation module 420 comprises a counter 422, a comparator 424, and an adder 426. In some embodiments of the invention, the counter 422 comprises an initial value zero. While each elements Qij is stored in the internal memory 440, the comparator 424 determines whether the value of the element Qij is non-zero. When one element Qij has a non-zero value, the adder 426 adds a predetermined number to the counter 422, such as one. In the following description, the adder 426 adds one to the counter 422 when one element Qij has a non-zero value.

In FIGS. 5a and 5b wherein the array Q comprises 14 non-zero elements, after the entire array Q is input to the calculation module 420, the value of the counter 422 is 14.

The scan control module 408 reads elements of the array Q in a specific order from the internal memory 440 for sequential scan wherein elements of the 2-dimensional array Q is rearranged to the one-dimensional array S according to a specific order.

Please refer to FIGS. 5a, 5b, 7 to 9. Three common sequential scan types in a conventional image compression/decompression are alternate vertical scans, alternate horizontal scans, and zigzag scans. The scan orders thereof are shown in FIGS. 7 to 9. The numbers on elements Qij of the array Q in FIGS. 7 to 9 represent the scan order of elements Qij, wherein elements Qij numbered with less numbers are arranged (scanned) into the one-dimensional array farther in advance. For example, elements Qij in FIG. 7 are arranged into the one-dimensional array with the following element order as Q00, Q10, Q20, Q30, Q01, Q11, Q02, Q12, Q21, Q31, Q40, Q50, Q60, Q70, Q71, Q61, . . . Q47, Q57, Q67, and Q77. Elements Qij in FIG. 8 are arranged into one-dimensional array in the following element order as Q00, Q01, Q02, Q03, Q10, . . . Q74, Q75, Q76, and Q77.

Typically, the element Q00 (DC frequency domain element) in the array Q is a DC component of the frequency domain of the block B corresponding thereto, and other elements (AC frequency domain elements) are the AC components of the frequency domain. In the array Q, as the distance of elements from the element Q00 increases, the elements (such as elements in the lower-right corner of the array Q) correspond to higher frequency, and the probability that the elements have a zero value increases. Thus, elements in upper-left corner (elements closer to the element Q00) of the array Q are scanned farther in advance than other elements in FIGS. 7 to 9 for subsequent run-length encoding.

In the following description, scan control module 408 performs a zigzag scan to sequentially retrieve and read elements of the array Q from internal memory 440.

Figure 10:
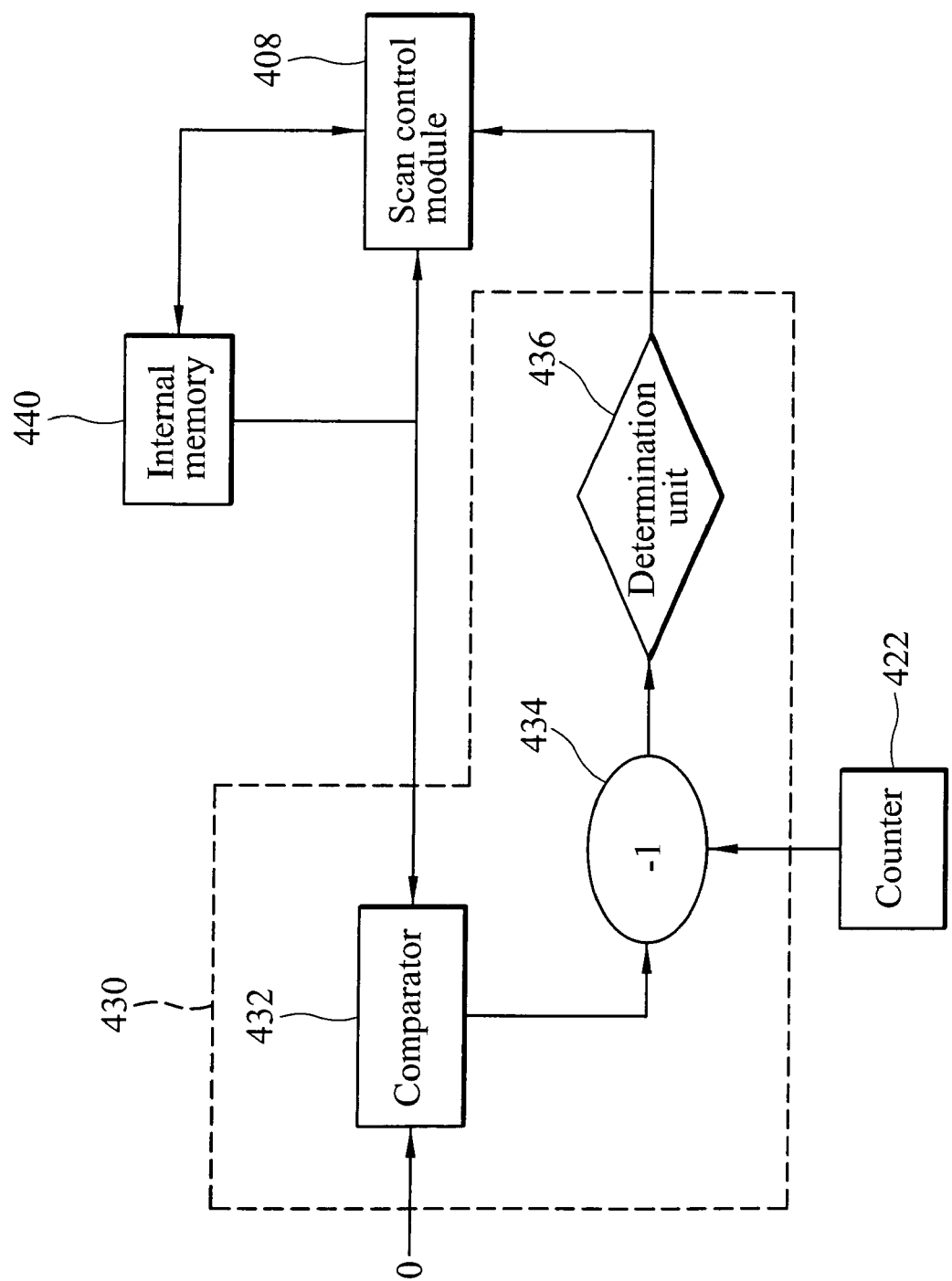
FIG. 10 is a schematic diagram of an exemplary decision module in FIG. 4 according to an embodiment of the invention.

In FIG. 10, decision module 430 comprises comparator 432, subtractor 434, and determination unit 436.

The Scan control module 408 outputs each element Qij read from the internal memory 440 to the comparator 432, the comparator 432 determines whether the value of the element Qij is non-zero. When one element Qij has a non-zero value, subtractor 434 subtracts a predetermined number from counter 422, such as one. In this example, subtractor 434 subtracts one from counter 422 when one element Qij has a non-zero value. Determination unit 436 determines whether the value of counter 422 is equal to the initial value thereof. If so, Determination unit 436 notifies scan control module 408 to stop reading the array Q and output the remaining elements. If not, decision module 430 notifies scan control module 408 to continue zigzag scanning to read elements from internal memory 440.

In FIGS. 5a and 5b, wherein the array Q comprise 14 non-zero elements, when the scan control module 408 performs a zigzag scan of the element Q50, the value of the counter 422 is cleared. At the same time, the scan control module 408 stops reading the array Q since the values of the remaining elements which have not been read by the scan control module 408 are zero.

In conclusion, accessing sparse matrices of frequency domain via an internal memory of a processing circuit may be time consuming in a conventional image compression (encoding) process. In some embodiments of the invention, the number of non-zero elements of an array is counted by a calculation module as array elements are stored in internal memories. During a sequential scan, a decision module determines whether the number of non-zero elements read by a scan control module has reached to the number counted by a calculation module. If so, the decision module notifies the scan control module to stop reading the frequency domain array to omit retrieval of the remaining elements of the array. Thus, the image compression speed may potentially be increased.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data encoding method comprising:
   storing a data array comprising a plurality of elements in a memory and counting the number of elements not equal to a predetermined value;
   reading elements of the data array by a control module and determining whether the number of read elements not equal to the predetermined value is equal to the counted number; and
   when the number of read elements not equal to the predetermined value is equal to the counted number, stopping reading of elements of the data array.

2. The method as claimed in claim 1, wherein determining further comprises when the number of read elements not equal to the predetermined value is not equal to the counted number, continuing reading of elements of the data array by utilizing the control module.

3. The method as claimed in claim 1, further comprising:
   retrieving image data;
   generating a block based on the image data;
   performing frequency domain transformation on the block to generate transformed data; and
   generating the data array based on the transformed data.

4. The method as claimed in claim 3, wherein generating the data array comprises quantizing the transformed data to generate the data array.

5. The method as claimed in claim 1, wherein the predetermined value is zero.

6. The method as claimed in claim 1, wherein the control module read the elements of the data array in a specific order.

7. The method as claimed in claim 1, further comprising:
setting a counter to an initial value;
while storing elements of the data array to the memory, determining if an element is equal to the predetermined value for each element stored or to be stored; and
when an element is not equal to the predetermined value, adding a specific value to the counter.

8. A method as claimed in claim 7, comprising:
determining whether elements read by the control module is equal to the predetermined value;
when a read element is not equal to the predetermined value, subtracting the specific value from the counter;
determining whether the value of the counter is equal to the initial value; and
when the value of the counter is equal to the initial value, stopping the control module from reading elements of the data array.

9. A data encoding circuit, comprising:
a memory storing a data array comprising a plurality of elements;
a calculation module counting the number of elements not equal to a predetermined value while elements of the data array are stored in the memory;
a control module reading elements of the data array; and
a decision module determining whether the number of read elements not equal to the predetermined value is equal to the counted number, and when the number of read elements unequal to the predetermined value is not equal to the counted number, stopping the control module from reading elements of the data array.

10. The circuit as claimed in claim 9, wherein determining further comprises when the number of read elements not equal to the predetermined value is not equal to the counted number, the decision module notifies the control module to keep reading elements of the data array.

11. The circuit as claimed in claim 9, further comprising:
a frequency domain transformation module performing frequency domain transformation on a block to generate transformed data; and
a quantization module generating the data array based on the transformed data.

12. The circuit as claimed in claim 11, wherein the quantization module generates the data array by quantizing the transformed data.

13. The circuit as claimed in claim 9, wherein the predetermined value is zero.

14. The circuit as claimed in claim 9, wherein the control module reads the elements of the data array in a specific order.

15. The circuit as claimed in claim 9, further comprising:
a counter comprising an initial value;
a comparator determining if an element is equal to the predetermined value for each element of the data array; and
an adder adding a specific value to the counter when an element is not equal to the predetermined value.

16. The circuit as claimed in claim 15, wherein the decision module further comprises:
a second comparator determining whether elements read by the control module equal the predetermined value;
a subtractor subtracting the specific value from the counter when a read element is unequal to the predetermined value; and
a determination unit determining whether the value of the counter is equal to the initial value, and when the value of the counter is equal to the initial value, stopping the control module from reading elements of the data array.

* * * * *